United States Patent [19]
Chen et al.

[11] Patent Number: 6,160,850
[45] Date of Patent: Dec. 12, 2000

[54] MOTION ESTIMATOR EMPLOYING A THREE-STEP HIERACHICAL SEARCH BLOCK-MATCHING ALGORITHM

[75] Inventors: Liang-Gee Chen, Shin-Diann; Yung-Ping Lee, Chung-her; Yeong-Kang Lai, Shin-Diann, all of Taiwan

[73] Assignee: National Science Council, Taipei, Taiwan

[21] Appl. No.: 09/128,523

[22] Filed: Aug. 3, 1998

[30] Foreign Application Priority Data

May 21, 1998 [TW] Taiwan ................................. 87107905

[51] Int. Cl.$^7$ ..................................................... H04N 7/12
[52] U.S. Cl. ..................................... 375/240.16; 348/699
[58] Field of Search ........................ 375/240.16; 348/699, 348/700, 402.1, 407.1, 408.1, 413.1, 416.1

[56] References Cited

U.S. PATENT DOCUMENTS

| | | | |
|---|---|---|---|
| 5,173,772 | 12/1992 | Choi | 348/416 |
| 5,387,947 | 2/1995 | Shin | 348/699 |
| 5,610,658 | 3/1997 | Uchida et al. | 348/416 |
| 5,754,237 | 5/1998 | Jung | 348/413 |
| 5,781,249 | 7/1998 | Hwang | 348/699 |
| 5,838,392 | 11/1998 | Chen et al. | 348/699 |
| 5,864,372 | 1/1999 | Chen et al. | 348/699 |
| 5,926,231 | 7/1999 | Jung | 348/699 |

OTHER PUBLICATIONS

Thou–Ho Chen, "A cost–effective three–step hierarchical search block–matching chip for motion estimation", IEEE Journal of Solid State Circuits, vol. 33, Issue 8, Aug. 1998.

Yeo et al, "A high–throughput modular architecture for three–step search block matching motion estimation", ICASSSP–96, vol. 4, IEEE, May, 1996.

Xu et al, "An Improved Three–Step Search Block–Matching Algorithm for Low Bit–Rate Video Coding Applications", IEEE, Aug., 1998.

*Primary Examiner*—Vu Le
*Attorney, Agent, or Firm*—Randall J. Knuth

[57] ABSTRACT

A motion estimator, employing a three-step hierarchical search block-matching algorithm for obtaining a motion vector by block-matching between a current block and its corresponding block, is provided. The motion estimator comprises: a memory block, a matching unit and a control unit. The memory block is for storing a candidate block corresponding to the current block. The matching unit matches the size of a current block with aforementioned candidate block and sub-candidate blocks identical to the current block. The control unit supplies candidate blocks in the memory blocks to the matching unit according to a prescribed matching sequence, and writes the candidate block corresponding to the current block to the section no longer used in the memory block simultaneous to the performance of Step 3 of a three-step hierarchical search block-matching algorithm.

4 Claims, 3 Drawing Sheets

MOTION ESTIMATOR EMPLOYING A THREE-STEP HIERARCHICAL SEARCH BLOCK-MATCHING ALGORITHM

BACKGROUND OF THE INVENTION

1. Field of the Invention

The present invention relates to a motion estimator, particularly to a motion estimator employing a three-step hierarchical search block-matching algorithm, wherein only two memory blocks, as opposed to three with conventional motion estimators, are required.

2. Description of the Related Art

Video applications have been widely used in recent years. Imaging and video compressing technologies have played a pivotal role in modern communication and storage media. Consumer electronic products, such as videophone, video conferencing, high-resolution digital television (HDTV) and random access video, all employ data compression technology to minimize data volume for transmission and storage, and to render a higher picture quality in relation to the input/output bandwidth. Motion estimators are used for compression in current video compression standards such as H.263, MPEG-1 and MPEG-2, to minimize redundancy between frames. Therefore, a fast and efficient motion estimator will enhance video compression technology. Particularly, the tremendous growth in data volume in applications such as HDTV indicates that a high-geared calculation-intensive motion estimator will be required in the future.

Block matching is often performed in motion estimation. The "Full Search", which finds the correct locations of the blocks and obtains better picture quality, is time-consuming and calculation-intensive. Faster methods are therefore developed to eliminate the disadvantages associated with the Full Search. Among them, the Three-Step Hierarchical Search Block-Matching Algorithm is most widely used, although the picture quality obtained therewith is degraded compared to that obtained with the Full Search. However the operation load is reduced to only about one-tenth of the load of the Full Search.

In a one-dimensional three-step hierarchical search block-matching framework, candidate blocks are stored in registers; whereas in two-dimensional three-step hierarchical search block-matching, such as "Parallel architecture for 3-step hierarchical search block-matching algorithm" proposed by H. M. Jong, L. G. Chen, and T. D. Chiueh in IEEE Trans. Circuits Syst. Video Technol. (Vol. 4, no. 4, pp.407–416, Aug. 1994), the candidate blocks are stored in the static random access memory (SRAM), which is smaller in size than registers and is accessed with memory interleaving. This algorithm yields a higher throughput but with the drawback that the SRAM has to store a data volume 1.5 times greater than that of the candidate blocks to maintain the sought after throughput.

FIG. 1 (Prior Art) is a diagram illustrating the memory layout of a conventional three-step hierarchical search block-matching motion estimator using memory interleaving, wherein $C_n$ denotes a current block of 16×16 and the corresponding candidate blocks $B_n$ are placed in $P_0$ and $P_1$ in an interleaving manner. Each of the two memory blocks $P_0$ and $P_1$ is one half of the size of the candidate block $B_n$. While block-matching is being performed in block $C_n$, the corresponding section of the candidate block $B_{n+1}$ of the next current block $C_{n+1}$ has to be stored in advance in the memory block $P_2$, which is also one half of the size of the candidate block $B_n(B_{n+1})$. Therefore, when block-matching of $C_n$ is completed, block-matching of $C_{n+1}$ can be performed immediately. In this case, the corresponding candidate block of block $C_{n+1}$ is already stored in memory blocks $P_1$ and $P_2$ and the data stored in the memory block $P_0$ are no longer needed, thereby freeing up memory block $P_0$ for storing the candidate block $B_{n+2}$ of the current block $C_{n+2}$ in advance.

In this framework, a memory block needs to store 30×16 (~10.5K) bits of data (that is about one half of the candidate block), hence three memory block are required to store 1.5 K bits of data. This will take up approximately one half of the size (area) of the hardware. Consequently, a reduction in memory blocks will significantly reduce the size of the required hardware components.

SUMMARY OF THE INVENTION

Therefore, the primary purposes of the present invention are to provide a motion estimator that utilizes a three-step hierarchical search block-matching algorithm that reduces the required size of the memory by one-third while maintaining the original output volume.

To achieve the above and other objects, the present invention provides a motion estimator that utilizes a three-step hierarchical search block-matching algorithm for block-matching between a current block and its corresponding block to obtain a motion vector. The motion estimator comprises: a memory block, a matching unit and a control unit. The memory block stores a candidate block corresponding to the current block. The matching unit matches a current block of the same size with aforementioned candidate block and sub-candidate block and takes the differential vector between the current block and its most approximate sub-candidate block as the motion vector. The control unit supplies the candidate blocks in the memory blocks to the matching unit according to a predetermined matching sequence, and writes the candidate block corresponding to the current block to the section no longer used in the memory block simultaneous to the performance of Step 3 of the three-step hierarchical search block-matching algorithm.

Therefore, the memory block and the candidate block are of the same size, only two-thirds the size of the conventional algorithm. In addition, the sub-candidate blocks most approximate to the corresponding block can be determined with the smallest average absolute error or the smallest average square error.

BRIEF DESCRIPTION OF THE DRAWINGS

The above objects, features and advantages will become evident from the following detailed description of a preferred embodiment with reference to the accompanying drawings, wherein.

DETAILED DESCRIPTION OF THE PREFERRED EMBODIMENT

Figure 4:
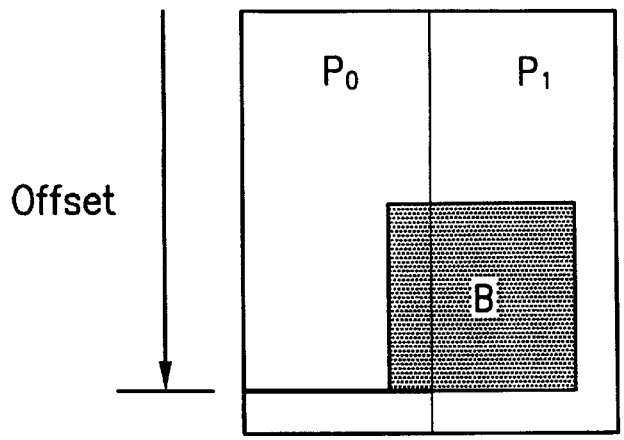
FIG. 4 is a diagram illustrating the memory layout of the three-step hierarchical search block-matching motion estimator of the present invention.

Refer to FIG. 4, a diagram illustrating the memory layout of the three-step hierarchical search block-matching motion estimator of the present invention. When the motion estimator is performing Step 3 of a three-step hierarchical search block-matching algorithm, the section not belonging to the candidate block $B_n$ in memory block $P_0$ will no longer be used, since the memory block $P_0$ and $P_1$ (18×18 in size) in the candidate block $C_n$ needs to be matched and calculated only once. In addition, since the data in the candidate block $B_n$ need to be read only once in Step 3 and are no longer used thereafter, the section not belonging to the candidate block $B_n$ in memory block $P_0$, and the section belonging to the candidate block $B_n$ in memory block $P_0$ but having been read, can be written to the new candidate block $B_{n+1}$. Candidate block $B_n(B_{n+1})$ is normally read by means of raster scan. The motion estimator of the present invention writes in Step 3 the new candidate block $B_{n+1}$ from the next line of the original candidate block $B_n$ to memory block $P_0$ through raster scan, and continues to write candidate block $B_{n+1}$ at the beginning of the memory block $P_0$ after writing to the end of the memory block $P_0$. While the new candidate block $B_n$ is written, the original candidate block $B_n$ is also read. Therefore, when the new candidate block $B_{n+1}$ is written to any address in the original candidate block $B_n$, the original candidate block $B_n$ should be read out. With appropriate arrangement in the timing sequence, the new candidate block $B_{n+1}$ will not be written to the parts of the original candidate block $B_n$ not yet read; that is, the write address cannot catch up with the read address.

In this framework, since the location the new candidate block $B_{n+1}$ is written to is no longer the initial address in the memory block $P_0$, a shift value Offset has to be stored. Consequently, the exact address for the next matching can be easily obtained from the original read address, including a vertical address RVi (not shown) and a horizontal address RHi (not shown), by adding the shift value Offset to the original read address.

In addition, data writing should be completed at the same time Step 3 ends to allow the immediate undertaking of the next block-matching.

Figure 2:
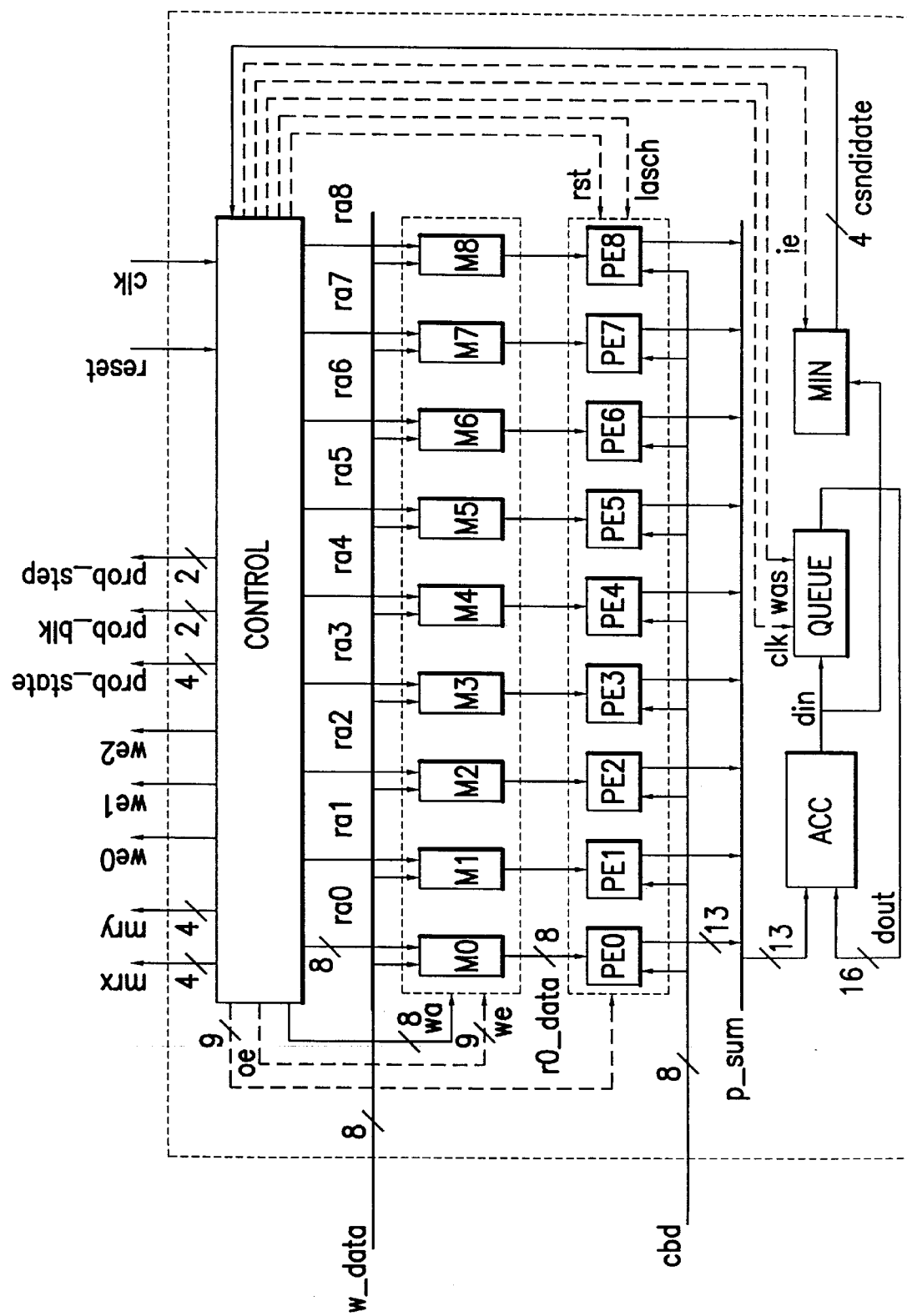
FIG. 2 (Prior Art) illustrates the circuit structure of a conventional three-step hierarchical search block-matching motion estimator using memory interleaving.

FIG. 2 (Prior Art) illustrates the circuit structure of a conventional three-step hierarchical search block-matching motion estimator using memory interleaving. In this circuit framework, the 9 matching actions in each Step are simultaneously performed by respective processor elements (PE) PE0–PE8. Also, the previous frame data required in each Step are distributed in nine memories M0–M8, hence each Step is divided into 9 time slots. The operation of this circuit framework is specified as follows: a matching A out of the 9 matches in time slot 0 is processed by the processing unit PE0 for calculating its partial sum, which will then be added, together with the partial sums from the other 8 processing units PE1–PE8, to the queue belonging to part of the matching A at the end of the time slot 0. Consequently, at the end of the time slot 8, the mean average error (MAE) of the nine matches can all be obtained through an accumulator ACC. Each processing unit PE1–PE8 calculates for each individual matching (such as matching A), respectively. And those 9 processing units PE1–PE8 are used in each Step to perform each matching. The smallest mean average error selector MIN then selects the smallest mean error among all 9 matchings in each Step and determines the address for the next Step. In this case, it will take at least 256+K clock cycles to complete each Step, where the 256 clock cycles are the required time for matching and K clock cycles are the time required to determine the smallest mean average error and to generate the first address for the next Step. K is normally a value between 10 and 30 clock cycles. The main purpose of the control unit is to generate corrected memory addresses for data reading or writing operations.

The memory blocks in this framework are stored in a memory interleaving manner into 9 memory units M0–M8, respectively. Since the required memory blocks $P_0+P_1+P_2$ are of 30×16×3=1440 bytes in size, each memory unit needs to store 1440/9=160 bytes. The memory blocks in the framework of the present invention needs only to store the size of the memory blocks $P_0+P_1$, so each memory unit needs to store only 30×16×2/9=107 bytes.

Figure 1:
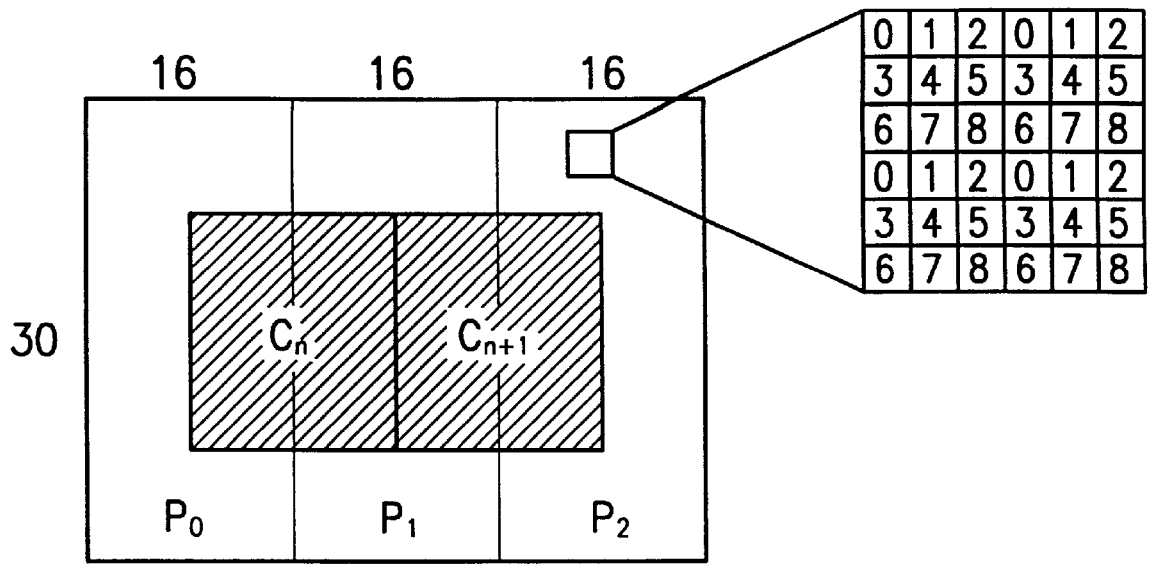
FIG. 1 (Prior Art) is a diagram illustrating the memory layout of a conventional three-step hierarchical search block-matching motion estimator using memory interleaving.
Figure 3:
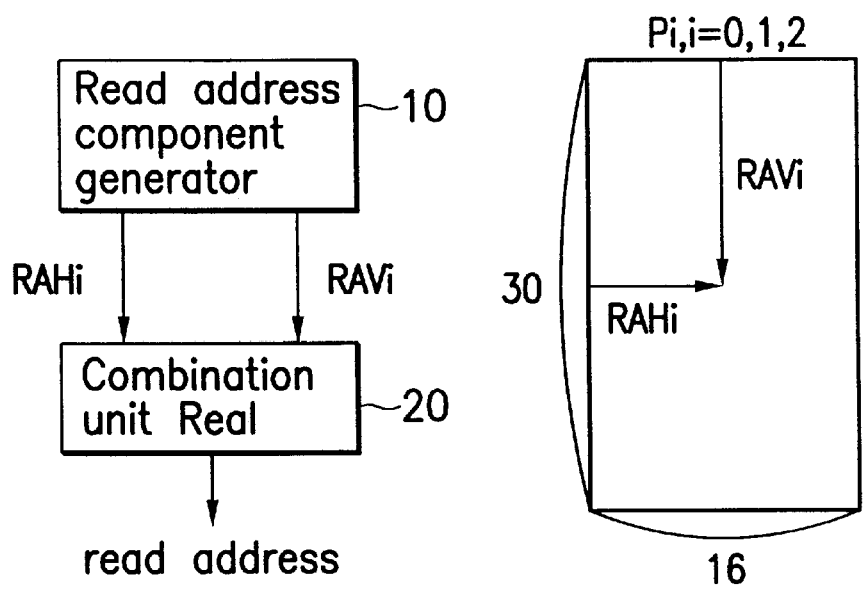
FIG. 3 (Prior Art) is a schematic circuit diagram illustrating the address-reading of a conventional three-step hierarchical search block-matching motion estimator using memory interleaving.
Figure 5:
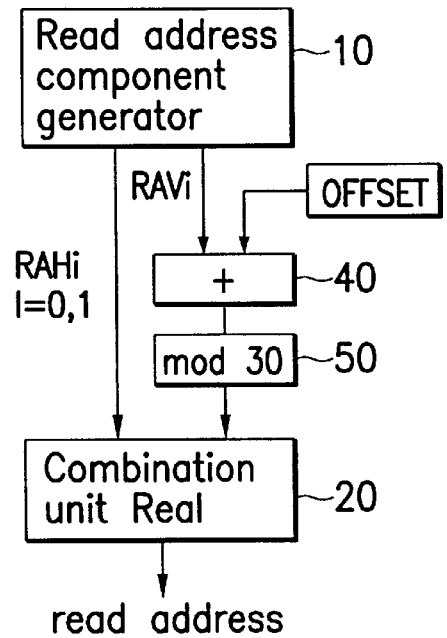
FIG. 5 is a schematic circuit diagram illustrating the address-reading of the three-step hierarchical search block-matching motion estimator of the present invention.

Another feature of the present invention is the way the control unit generates read addresses. Refer to FIG. 3 (Prior Art), a schematic circuit diagram illustrating the address-reading of a conventional three-step hierarchical search block-matching motion estimator using memory interleaving. Therein, the read address component generator 10 first reads the corresponding horizontal address RAHi and vertical address RAVi (i=0, 1, 2) of the pixel in the memory, as shown in the right diagram in FIG. 3. Further, the combination unit 20 determines the exact read address for reading a pixel. Refer next to FIG. 5, a schematic circuit diagram illustrating the address-reading of the three-step hierarchical search block-matching motion estimator of the present invention. Therein, the read address component generator 10 adds up the vertical address RAVi with the shift value Offset, then obtains a mode along with the vertical length of the memory block, for example 30. This Step is realized by adding an adder 40 and a mode operator mod 50, and prolongs the calculation time by only 1 to 2 clock cycles. The Offset is also taken into consideration in data writing in the same manner as with that in the generation of a read address.

Figure 6:
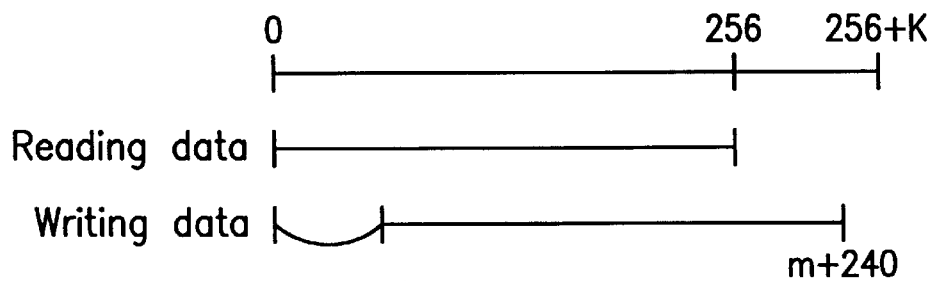
FIG. 6 is a schematic diagram illustrating the time sequence of data writing in the three-step hierarchical search block-matching motion estimator of the present invention.

As mentioned above, since the present invention has to write 16×30=480 bytes into the memory block in Step 3 and in Step 3 at least 256+k clock cycles are needed, at least 2 bytes per clock cycle have to be written. FIG. 6 is a schematic diagram illustrating the time sequence of data writing in the three-step hierarchical search block-matching motion estimator of the present invention. During the required 256+k time in Step 3, data are read in the previous 256 clock cycles and the data being read out will no longer be used afterwards. Data writing starts in the (m+1) clock cycle and ends in the (m+240) clock cycle. Therefore, only if 256<M+240<256+K, that is, 6<m<16+K, can it be ensured that data will not be written into the addresses not yet being read.

To summarize, the motion estimator of the present invention can reduce the required memory by one-third while maintaining the original output volume.

It should be understood that the present invention is not limited to the preferred embodiment as disclosed above. Variations and modifications can be made by those who are skillful in the art without departing from the spirit and scope of the present invention as defined in the appended claims.

What is claimed is:

1. A motion estimator, employing a three-step hierarchical search block-matching algorithm for obtaining a motion vector by block-matching between a current block and its corresponding block, comprising:

a memory block for storing a candidate block corresponding to the current block;

a matching unit for obtaining a motion vector by matching said current block with the corresponding candidate block of said corresponding candidate; and a control unit for supplying candidate blocks in the memory blocks to said matching unit for block-matching according to a predetermined sequential order, and writing said candidate current blocks to the addresses no longer used in said memory blocks at the same time Step 3 in the three-step hierarchical search block-matching algorithm is being performed.

2. The motion estimator according to claim 1, wherein the capacity of said memory blocks is just adequate for storing the candidate block of the corresponding current block.

3. The motion estimator according to claim 1, wherein the matching unit matches a current block of the same size with a sub-candidate block of the candidate block and takes the differential vector between the current block and its most approximate sub-candidate block as the motion vector.

4. The motion estimator according to claim 3, wherein, the sub-candidate block most approximate to the corresponding block is determined with the smallest average absolute error or the smallest average square error.

* * * * *